US005749951A

United States Patent [19]
Yoshiike et al.

[11] Patent Number: 5,749,951
[45] Date of Patent: May 12, 1998

[54] INK COMPOSITION FOR COLOR INK JET RECORDING AND RECORDING METHOD WITH THE SAME

[75] Inventors: Etsuko Yoshiike; Kiyohiko Takemoto; Kazuhide Kubota, all of Nagano, Japan

[73] Assignee: Seiko Epson Corporation, Tokyo, Japan

[21] Appl. No.: 634,412

[22] Filed: Apr. 18, 1996

[30] Foreign Application Priority Data

Apr. 19, 1995 [JP] Japan ................... 7-094014
Apr. 5, 1996 [JP] Japan ................... 8-083638

[51] Int. Cl.[6] .................................. C09D 11/02
[52] U.S. Cl. ................... 106/31.27; 106/31.48; 106/31.49; 106/31.58; 106/31.59
[58] Field of Search ................... 106/31.27, 31.48, 106/31.49, 31.58, 31.59

[56] References Cited

U.S. PATENT DOCUMENTS

| 5,108,504 | 4/1992 | Johnson et al. | 106/31.37 |
| 5,196,056 | 3/1993 | Prasad | 106/31.58 |
| 5,273,573 | 12/1993 | Kappele | 106/31.27 |
| 5,560,771 | 10/1996 | Takemoto et al. | 106/31.49 |

FOREIGN PATENT DOCUMENTS

A-0 529 904 3/1993 European Pat. Off. .
5-214259 8/1993 Japan .................... C09B 67/22
WO 94/26828 11/1994 Japan .

OTHER PUBLICATIONS

Database WPI Week 8406 Derwent Publications Ltd., London, GB; AN 84033177 XP002008652 & JP–A–58 222 166 (Ricoh), 23 Dec. 1983 *abstract*.

Database WPI Week 8638 Derwent Publications Ltd., London, GB; AN 86248810 XP002008653 & JP–A–61 176 677 (Ricoh), 8 Aug. 1986 *abstract*.

*Primary Examiner*—Helene Klemanski
*Attorney, Agent, or Firm*—Sughrue, Mion, Zinn, Macpeak & Seas, PLLC

[57] ABSTRACT

A magenta ink composition comprising C.I. Direct Red 227 in an amount of 0.3 to 3.5% by weight, a water-soluble high boiling low volatility organic solvent and water is disclosed. A set comprising the magenta ink composition, a yellow ink composition comprising a 1:3 to 3:1 by weight mixture of C.I. Direct Yellow 86 and C.I. Direct Yellow 132 in an amount of 0.3 to 3.0% by weight and a cyan ink composition comprising at least one of C.I. Direct Blue 86 and C.I. Direct Blue 199 in an amount of 1.0 to 4.0% by weight is also disclosed. An ink jet recording method using the foregoing ink set is further disclosed. The ink composition provides an excellent color reproducibility range and causes no deterioration of printed matter.

9 Claims, No Drawings

INK COMPOSITION FOR COLOR INK JET RECORDING AND RECORDING METHOD WITH THE SAME

FIELD OF THE INVENTION

The present invention relates to an ink jet composition for color ink jet recording and a color ink jet recording method.

BACKGROUND OF THE INVENTION

In the formation of a color image by an ink jet recording method, at least a magenta ink, a yellow ink and a cyan ink are normally used. It is important that these inks each have an excellent color reproducibility range. It is further important that even when a magenta ink, a yellow ink and a cyan ink are superposed on each other to form red, green, blue and black colors, a good color reproducibility can be realized.

Further, the color ink composition for use in ink jet recording must satisfy general requirements for ink composition for ink jet recording. In some details, the color ink composition must maintain its composition and physical properties during storage to prevent itself from clogging the nozzle.

In respect to these requirements, JP-A-5-214259 (The term "JP-A" as used herein means an "unexamined published Japanese patent application") discloses that an excellent color reproducibility can be realized by the use of an ink set comprising a specific dye set consisting of C.I. Acid Yellow 23, C.I. Direct Red 227 and C.I. Acid Blue 9. Further, U.S. Pat. No. 5,273,573 discloses that an excellent color reproducibility can be realized by the use of an ink set comprising a specific dye set consisting of C.I. Acid Yellow 23, C.I. Acid Red 52 and C.I. Acid Blue 9.

However, printed matters obtained by the conventional ink jet recording method employing these dyes are disadvantageous in that they are apt to deterioration when exposed to water or light. When printing is performed on a paper or film adapted for ink jet recording, fastness is particularly required. Fastness can be improved by improving the paper. However, this approach leaves something to be desired in solving the problems of the prior art ink jet recording method. In other words, the prior art color ink jet recording method is disadvantageous in that when-exposed to light, the printed matters are apt to discoloration. Further, since two or three color inks are overtyped to form an image in the color ink jet recording method as mentioned above, an approach which comprises reducing the duty (duty: number of ink jetted dots per unit area) of the overtyped area can be employed. However, this approach is disadvantageous in that the ink can be attached to the overtyped area more than to a single ink area. The resulting printed matters are apt to bleeding that impairs the image quality when allowed to stand in a high humidity atmosphere.

The inventors made extensive studies of an approach which satisfies requirements for ink composition for color ink jet recording method, ink composition set for color ink jet recording method and color ink jet recording method to solve the foregoing problems. As a result, it was found that the foregoing problems can be solved by the use of a magenta ink composition comprising a specific dye and a solvent in combination or an ink composition set comprising the magenta ink composition, a specific yellow ink composition and a specific cyan ink composition.

SUMMARY OF THE INVENTION

It is therefore a major object of the present invention to provide an ink composition, ink composition set and recording method which are insusceptible to bleeding on the printed matter due to moisture and exhibit an excellent light resistance regardless of printing duty in the color ink jet recording method.

It is another object of the present invention to provide an ink composition, ink composition set and recording method which exhibit an excellent color reproducibility in the color ink jet recording method.

The present invention concerns a magenta ink composition for color ink jet recording comprising at least a dye, a water-soluble high boiling low volatility organic solvent and water, wherein as said dye there is contained C.I. Direct Red 227 in an amount of from 0.3 to 3.5% by weight.

The present invention also concerns a color ink jet recording method which comprises forming a color image with at least a magenta ink composition, a yellow ink composition and a cyan ink composition, wherein as said magenta ink composition there is used the foregoing magenta ink composition.

The present invention further concerns a set of ink composition sets for color ink jet recording each containing at least a dye, a water-soluble high boiling low volatility organic solvent and water, comprising in combination a magenta ink composition having C.I. Direct Red 227 incorporated therein as a dye in an amount of from 0.3 to 3.5% by weight, a yellow ink composition having a 1:3 to 3:1 mixture by weight of C.I. Direct Yellow 86 and C.I. Direct Yellow 132 incorporated therein as a dye in an amount of from 0.3 to 3.0% by weight, and a cyan ink composition having a dye selected from the group consisting of C.I. Direct Blue 86 and C.I. Direct Blue 199 incorporated therein as a dye in an amount of from 1.0 to 4.0% by weight.

The present invention still further concerns a color ink jet recording method which comprises the formation of a color image with at least a magenta ink composition, a yellow ink composition and a cyan ink composition, wherein the foregoing ink composition set is used.

The magenta ink composition according to the present invention comprises C.I. Direct Red 227 in an amount of from 0.3 to 3.5% by weight, preferably from 0.5 to 2.5% by weight based on the total weight of the foregoing magenta ink composition. The magenta ink composition according to the present invention allows the reproduction of an ideal magenta tone. In particular, an ideal color tone can be obtained with an ordinary paper, especially with an ordinary acid paper.

If the content of the foregoing dye in the magenta ink composition according to the present invention falls below 0.3% by weight, a sufficient color developability cannot be obtained. On the contrary, if the content of the foregoing dye exceeds 3.5% by weight, the resulting magenta ink composition clogs the nozzle. In other words, if the content of the foregoing dye deviates from the above defined range, the resulting color tone is a bluish or reddish magenta even when the magenta ink composition is printed singly. Thus, an ideal magenta tone cannot be reproduced. When overtyped on or by the other color ink compositions, the magenta ink composition cannot provide reproduction of a good red or blue tone. Further, a great difference in color reproducibility can be produced between ordinary neutral paper and ordinary acid paper. Moreover, the magenta ink composition can easily clog the ink nozzle of the recording head. If the content of the foregoing dye falls within the range of from 0.5 to 2.5% by weight, a more natural magenta hue can be obtained to advantage.

The yellow ink composition to be incorporated in the ink composition set comprising the foregoing magenta ink composition and the yellow ink composition in combination comprises a 1:3 to 3:1, preferably 1:2 to 2:1 mixture (by weight) of C.I. Direct Yellow 86 and C.I. Direct Yellow 132 each in an amount of from 0.3 to 3.0% by weight, preferably from 0.5 to 2.0% by weight, based on the total weight of the yellow ink composition. If the content of the foregoing two dyes deviates from the above defined range, a good red tone cannot be reproduced even when these ink compositions are overtyped. Further, a great difference in color reproducibility can be produced between ordinary neutral paper and ordinary acid paper. Moreover, the ink composition set can easily clog the ink nozzle of the recording head.

The cyan ink composition to be incorporated in the ink composition set comprising the foregoing magenta ink composition and the cyan ink composition in combination comprises at least a dye selected from the group consisting of C.I. Direct Blue 86 and C.I. Direct Blue 199 in an amount of from 1.0 to 4.0% by weight, preferably from 1.5 to 3.5% by weight, based on the total weight of the cyan ink composition. If the content of the foregoing two dyes deviates from the above defined range, a good blue tone cannot be reproduced even when these ink compositions are overtyped. Further, a great difference in color reproducibility can be produced between ordinary neutral paper and ordinary acid paper. Moreover, the ink composition set can easily clog the ink nozzle of the recording head.

The foregoing magenta ink composition, yellow ink composition and cyan ink composition each comprise as solvents a water-soluble high boiling low volatility organic solvent and water besides the foregoing specific dyes.

The foregoing water-soluble high boiling low volatility organic solvent is not specifically limited so far as it is a solvent for the foregoing dyes. Specific preferred examples of the water-soluble high boiling low volatility organic solvent will be given below.

(1) Alkylene glycol compound represented by the following general formula:

wherein $R^{11}$ and $R^{12}$ each independently represent a hydrogen atom, a methyl group or an ethyl group; $R^{13}$ represents a hydrogen atom or a $C_{1-4}$ lower alkyl group, preferably a hydrogen atom, a methyl group or an ethyl group; and t represents an integer of from 1 to 20, preferably from 1 to 15. Examples of such an alkylene glycol compound include glycol compounds such as ethylene glycol, diethylene glycol, triethylene glycol, propylene glycol, dipropylene glycol, polyethylene glycol and polypropylene glycol, monoether compounds such as ethylene glycol monomethyl (or ethyl) ether, diethylene glycol monomethyl (or ethyl) ether and triethylene glycol monomethyl (or ethyl) ether, and diether compounds such as triethylene glycol dimethyl (or ethyl) ether.

(2) Divalent alcohol compound represented by the general formula:

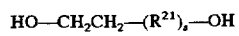

wherein $R^{21}$ represents a $C_{1-4}$ straight-chain or branched alkylene group; and s represents an integer of from 1 to 6, preferably from 1 to 4. Examples of such a divalent alcohol compound include 1,3-propanediol, 1,4-butanediol, 1,3-butanediol, 1,2-butanediol, 1,5-pentanediol, 1,4-pentanediol, 1,3-pentanediol, 1,2-pentanediol, 1,6-hexanediol, 1,5-hexanediol, 1,4-hexanediol, 1,3-hexanediol, and 1,2-hexanediol.

(3) Trivalent alcohol compound represented by the general formula:

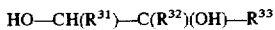

wherein $R^{31}$ and $R^{32}$ each independently represent a hydrogen atom or a $C_{1-4}$ lower alkyl group, preferably a hydrogen atom, a methyl group or an ethyl group; and $R^{33}$ represents a $C_{1-6}$ straight-chain or branched hydroxyalkyl group. Examples of such a trivalent alcohol compound include glycerin, and 1,2,6-hexanetriol.

(4) Ethanolamine compound represented by the general formula:

wherein $R^{41}$ represents a hydrogen atom or a $C_{1-4}$ lower alkyl group, preferably a hydrogen atom, a methyl group or an ethyl group; $R^{42}$ represents a hydrogen atom, a $C_{1-4}$ lower alkyl group or $-[CH_2CH(R^{41})OH]$; u represents an integer of from 1 to 3; and v represents 0 or an integer 1 or 2, with the proviso that the sum of u and v is 3. Examples of such a compound include monoethanolamine, N,N-dimethylethanolamine, N,N-diethylethanolamine, diethanolamine, triethanolamine, triisopropanolamine, and N-n-butyldiethanolamine.

(5) Other preferred examples of the water-soluble high boiling low volatility organic solvent include a 2- or 3-pyrrolidone compound which may be optionally substituted by a methyl group or an ethyl group in N-position. Examples of such a 2- or 3-pyrrolidone compound include 2-pyrrolidone, N-methyl-2-pyrrolidone, imidazolidinone compound which may be optionally substituted by two methyl groups in N-position, such as 1,3-dimethyl-2-imidazolidinone, $C_{2-4}$ thioglycol compound such as thioglycol and thiodiglycol, trimethylol-substituted $C_{2-4}$ lower alkane compound such as trimethylolethane and trimethylolpropane, and urea.

In the present invention, the organic solvents listed in the foregoing groups (1) to (5) may be used singly or in combination. These organic solvents act to prevent the clogging of the nozzle and thus can be used as humectants. However, the hygroscopicity of these solvents worsens bleeding on paper adapted for ink jet recording and printed film due to humidity. Therefore, the foregoing solvent is preferably incorporated in the ink composition in an amount of from 5 to 30% by weight, more preferably from 9 to 20% by weight based on the total weight of the ink composition.

The ink composition set according to the present invention comprises in combination the foregoing magenta ink composition, yellow ink composition and cyan ink composition each having at least the foregoing specific dye, water-soluble high boiling low volatility organic solvent, and water incorporated therein.

The tone of red, green and blue formed by overtyping two out of the foregoing magenta ink composition, yellow ink composition and cyan ink composition and black formed by overtyping the three ink compositions, not to mention magenta, yellow and cyan obtained directly by ink jet printing of these ink compositions, respectively, are closely related to the combination of the kind and amount of dyes. Thus, an ink composition set comprising the magenta ink composition of the present invention, and the foregoing yellow ink composition and cyan ink composition can be obtained. Further, a printed matter can be obtained which shows an almost ideal tone on the black area formed by overtyping the three colors from the ink composition set comprising the magenta ink composition of the present invention, and the foregoing yellow ink composition and cyan ink composition. Moreover, a printed matter can be obtained which shows an excellent color reproducibility of an ink comprising a black dye. In the ink composition set according to the present invention, if dyes of kind different from the foregoing specific dye are used, or if ink compositions comprising the foregoing dyes in an amount deviating from the above defined range are used, the various colors cannot be provided with an ideal tone. Moreover, such an ink composition set can easily clog the nozzle of the recording head and thus cannot be stably jetted.

Bleeding on the paper adapted for ink jet recording and printed film due to moisture or the light resistance of these materials is closely related to the dyes incorporated in the ink composition. Thus, the ink composition set of the present invention is extremely effective for the preservability of the printed matter.

The various ink compositions constituting the ink composition set of the present invention may optionally comprise an organic solvent other than the foregoing water-soluble high boiling low volatility organic solvent incorporated therein. Specific examples of the organic solvent include amides such as dimethylformamide and dimethylacetamide, ketones and ketone alcohols such as acetone and diacetone alcohol, cyclic ethers such as tetrahydrofuran and dioxane, $C_{1-5}$ alkylalcohols such as methyl alcohol, ethyl alcohol, n-propyl alcohol and n-butyl alcohol, sulfolane, pyrrolidone, N-methyl-2-imidazolidinone, and 1,5-pentanediol. These organic solvents may be used singly or in admixture. Such an organic solvent is preferably used in an amount of not more than 10% by weight based on the total weight of the foregoing ink composition.

The various ink compositions constituting the ink composition set of the present invention may optionally comprise a lower alkyl ether of polyvalent alcohol. A preferred example of the lower alkyl ether of polyvalent alcohol is a compound represented by the following general formula:

$$R^{51}O-[CH_2-CH(R^{53})-O]_t-R^{52}$$

wherein $R^{51}$ and $R^{52}$ each independently represent a hydrogen atom or a $C_{3-6}$ alkyl group (preferably butyl group); $R^{53}$ represents a hydrogen atom or a $C_{1-4}$ lower alkyl group, preferably a hydrogen atom, a methyl group or an ethyl group; and t represents an integer of from 1 to 8, preferably from 1 to 4, with the proviso that at least one of $R^{51}$ and $R^{52}$ is a $C_{3-6}$ alkyl group (preferably butyl group). Examples of the lower alkyl ether of polyvalent alcohol include monoethylene glycol-$C_{3-6}$ alkyl ether, diethylene glycol-$C_{3-6}$ alkyl ether, triethylene glycol-$C_{3-6}$ alkyl ether, monopropylene glycol-$C_{3-6}$ alkyl ether, dipropylene glycol-$C_{3-6}$ alkyl ether, and tripropylene glycol-$C_{3-6}$ alkyl ether. Preferred among these lower alkyl ethers of polyvalent alcohol are triethylene glycol monobutyl ether, diethylene glycol monobutyl ether, diethylene glycol monoethyl ether, diethylene glycol monomethyl ether, and propylene glycol monobutyl ether. Most preferred among these lower alkyl ethers of polyvalent alcohol is triethylene glycol monobutyl ether. The content of such a lower alkyl ether of polyvalent alcohol is preferably from 7 to 12% by weight, more preferably from 7 to 10% by weight based on the total weight of the ink composition.

The sum of the content of the water-soluble high boiling low volatility organic solvent and the lower alkyl ether of polyvalent alcohol in the ink composition of the present invention is preferably from 15 to 30% by weight based on the total weight of the ink composition. This is because that if the sum of the content of the two components falls within the above defined range, ink compositions excellent in all of color reproducibility, discharge stability, and intermittent discharge characteristics on ordinary paper can be obtained.

The various ink compositions constituting the ink composition set of the present invention may optionally comprise an acetylene glycol represented by the following general formula (I) incorporated therein:

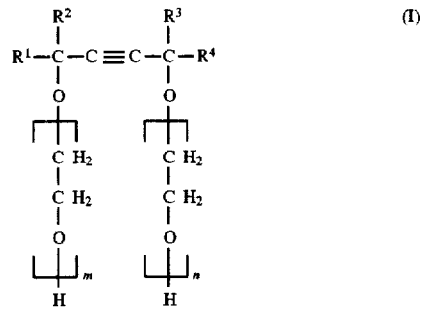

wherein $R^1$, $R^2$, $R^3$ and $R^4$ each independently represent a $C_{1-6}$ straight-chain or branched alkyl group; and the sum of n and m is from 0 to 30, preferably from 0 to 15.

Specific examples of the acetylene glycol will be given in Table 1.

TABLE 1

|  | $R^1$ | $R^2$ | $R^3$ | $R^4$ | n + m |
|---|---|---|---|---|---|
| No. 1 | iso-Butyl | Methyl | Methyl | iso-Butyl | 10 |
| No. 2 | iso-Butyl | Methyl | Methyl | iso-Butyl | 3.5 |
| No. 3 | Ethyl | Methyl | Methyl | Ethyl | 10 |
| No. 4 | Methyl | Methyl | Methyl | Methyl | 0 |
| No. 5 | Ethyl | Methyl | Methyl | Ethyl | 0 |
| No. 6 | iso-Butyl | Methyl | Methyl | iso-Butyl | 0 |

Most preferred among the compounds shown in Table 1 is No. 1 acetylene glycol. As these acetylene glycols there may be used commercially available products. For example, Surfynol 82, Surfynol 104, Surfynol 440 and Surfynol 465 (manufacturer: Air Product and Chemicals, Inc.; dealer: Shin-Etsu Chemical Co., Ltd.) may be used. The content of the acetylene glycol is preferably from 0.5 to 1.2% by weight, more preferably from 0.5 to 1% by weight based on the total weight of the ink composition.

The combination of the foregoing lower alkyl ether of polyvalent alcohol and acetylene glycol in the foregoing respective content can prevent the deterioration of printing quality due to color stain across adjacent dots, which often presents a problem in the color ink jet recording method.

The various ink compositions constituting the ink composition set of the present invention each may comprise an additive for improving various properties of ink composition. For example, for the purpose of controlling various physical properties such as viscosity, surface tension, pH and specific resistivity and inhibiting corrosion and fungus growth, anionic surface active agents such as aliphatic acid salt, ester alkylsulfate, alkylbenzenesulfonic acid and alkylnaphthalenesulfonic acid salt, nonionic surface active agents such as acetylene glycol, polyoxyethylene alkylphenyl ether, polyoxyethylene alkylphenyl ether, ester polyoxyethylenealiphate and ester sorbitanealiphate, water-soluble natural or synthetic high molecular compounds such as cellulose, polyvinyl pyrrolidone, polyvinyl alcohol and water-soluble resin, diethanolamines, triethanolamines, inorganic salts such as lithium chloride, ammonium chloride and sodium chloride, and benzotriazole may be used.

The color ink jet recording method of the present invention can be implemented by inserting a common ink cartridge loaded with the foregoing magenta ink composition of the present invention into a common color ink jet recording apparatus. Alternatively, the color ink jet recording method of the present invention can be implemented by inserting the foregoing ink cartridge loaded with the foregoing magenta ink composition, the foregoing ink cartridge loaded with the foregoing yellow ink composition and the foregoing ink cartridge loaded with the foregoing cyan ink composition into the color ink jet recording apparatus in combination. The color ink jet recording method of the present invention can also be implemented by the use of a color ink jet recording apparatus with an ink cartridge having the foregoing magenta ink composition, the foregoing yellow ink composition and the foregoing cyan ink composition loaded in the respective compartment.

The ink jet recording method according to the present invention performs color ink jet recording, preferably with the foregoing magenta ink composition, the foregoing yellow ink composition and the foregoing cyan ink composition, optionally combined with a common black ink composition. A color ink jet recording with the foregoing magenta ink composition, a common yellow ink composition other than the foregoing yellow ink composition and a common cyan ink composition other than the foregoing cyan ink composition, optionally combined with a common black ink composition, is included in the present invention. In the color ink jet recording method according to the present invention, the reproduction of the three colors, i.e., magenta, yellow and cyan is excellent. In addition, by overtyping any two of these ink compositions, red, green and blue with an almost ideal tone can be obtained free from the effect of the quality of the recording paper. In other words, red formed by overtyping the magenta ink and the yellow ink on each other and blue formed by overtyping the magenta ink and the cyan ink on each other on various recording papers are the reproduction of the respective color with an almost ideal tone free from the effect of the quality of the paper (e.g., ordinary recording paper with a high acidity).

In a preferred embodiment of the present invention, the amount of the magenta ink composition, yellow ink composition and cyan ink composition to be jetted for the formation of red, green or blue may be equal. In general, it is theoretically possible to control the tone of red, green and blue formed by overtyping the foregoing ink compositions by properly controlling the amount of the yellow, magenta and cyan ink compositions to be jetted through the nozzle every tone. However, this approach is too complicated to be put into practical use. In other words, the differentiation of the jetted amount of the magenta ink composition from blue to green is not practical. Accordingly, the present invention is very advantageous in that red, green and blue can be reproduced with a good tone while keeping the jetted amount of the magenta, yellow and cyan ink compositions constant.

EXAMPLES

The present invention will be further described in the following examples. However, the present invention should not be construed as being limited to these examples.

Examples 1 to 6 and Comparative Examples 1 to 5

12 ink composition sets of Examples 1 to 6 and Comparative Examples 1 to 6 were prepared from the components set forth in Tables 2 to 4. The comparative set of Comparative Example 1 is an example of ink composition set comprising only dyes of the kind different from the specific dyes of the present invention incorporated therein besides three color ink compositions. The comparative sets of Comparative Examples 2 and 3 each comprise magenta and yellow ink compositions comprising the specific dyes of the present invention and dyes of the kind different therefrom in combination and a cyan ink composition comprising only dyes of the kind different from the specific dyes of the present invention incorporated therein. The comparative sets of Comparative Examples 4 and 5 each comprise ink compositions comprising dyes in an amount deviating from the range defined herein. Comparative Example 6 is an ink composition comprising a black dye incorporated therein.

In Tables 2 to 4, TEGmBE represents triethylene glycol monobutyl ether, and DEGmBE represents diethylene glycol monobutyl ether. In Tables 2 to 4, the unit of the amount of the various constituent components of the ink compositions is % by weight. The balance is ion-exchanged water.

TABLE 2

| Ink composition | Example 1 | | | Example 2 | | | Example 3 | | | Example 4 | | |
| --- | --- | --- | --- | --- | --- | --- | --- | --- | --- | --- | --- | --- |
| C.I. Direct Red 227 | 3.5 | | | 2 | | | 1.2 | | | 2 | | |
| C.I. Acid Red 52 | | | | | | | | | | | | |
| C.I. Acid Red 249 | | | | | | | | | | | | |
| C.I. Direct Yellow 86 | | 2 | | | 0.5 | | | 0.4 | | | 1 | |
| C.I. Direct Yellow 132 | | 0.75 | | | 0.7 | | | 0.8 | | | 0.5 | |
| C.I. Acid Yellow 32 | | | | | | | | | | | | |
| C.I. Direct Blue 86 | | | 4 | | | 3.5 | | | | | | |
| C.I. Direct Blue 199 | | | | | | | | | 2 | | | 3.5 |
| C.I. Acid Blue 9 | | | | | | | | | | | | |
| C.I. Direct Black 168 | | | | | | | | | | | | |
| TEGmBE | 12 | 12 | 12 | 10 | 10 | 10 | 10 | 10 | 10 | 8 | 8 | 8 |
| DEGmBE | | | | | | | | | | | | |
| Diethylene glycol | 14 | 16 | 13 | 18 | 20 | 15 | | | | | | |
| Glycerin | | | | | | | 12 | 11 | 9 | 11 | 12 | 10 |
| Surfynol 465* | 0.5 | 0.5 | 0.5 | 0.8 | 0.8 | 0.8 | 1 | 1 | 1 | 1 | 1 | 1 |
| Proxel XL-2** | 0.3 | 0.3 | 0.3 | 0.3 | 0.3 | 0.3 | 0.3 | 0.3 | 0.3 | 0.3 | 0.3 | 0.3 |

*Acetylene glycol surface active agent (Shin-Etsu Chemical Co., Ltd.)
**mildewproofing agent (Zeneka)

TABLE 3

| Ink composition | Example 5 | Example 6 | Comparative Example 1 | Comparative Example 2 |
| --- | --- | --- | --- | --- |
| C.I. Direct Red 227 | 2.5 | 1.5 | | 1.5 |
| C.I. Acid Red 52 | | | 1 | 0.7 |
| C.I. Acid Red 249 | | | 1 | |
| C.I. Direct Yellow 86 | 0.7 | 0.25 | | 0.8 |
| C.I. Direct Yellow 132 | 1.5 | 0.75 | | |
| C.I. Acid Yellow 32 | | | 1.8 | 0.8 |
| C.I. Direct Blue 86 | | 1.5 | | |

TABLE 3-continued

| Ink composition | Example 5 | | | Example 6 | | | Comparative Example 1 | | | Comparative Example 2 | | |
|---|---|---|---|---|---|---|---|---|---|---|---|---|
| C.I. Direct Blue 199 | | 4 | | | 1.5 | | | | | | | |
| C.I. Acid Blue 9 | | | | | | | | | 3.5 | | | 2 |
| C.I. Direct Black 168 | | | | | | | | | | | | |
| TEGmBE | | | | 8 | 8 | 8 | 12 | 12 | 12 | | | |
| DEGmBE | 10 | 10 | 10 | | | | | | | 10 | 10 | 10 |
| Diethylene glycol | 14 | 15 | 9 | 14 | 16 | 11 | 16 | 16 | 13 | 18 | 20 | 19 |
| Glycerin | | | | | | | | | | | | |
| Surfynol 465* | 0.5 | 0.5 | 0.5 | 1.2 | 1.2 | 1.2 | 0.5 | 0.5 | 0.5 | 0.8 | 0.8 | 0.8 |
| Proxel XL-2** | 0.3 | 0.3 | 0.3 | 0.3 | 0.3 | 0.3 | 0.3 | 0.3 | 0.3 | 0.3 | 0.3 | 0.3 |

*Acetylene glycol surface active agent (Shin-Etsu Chemical Co., Ltd.)
**mildewproofing agent (Zeneka)

TABLE 4

| Ink composition | Comparative Example 3 | Comparative Example 4 | Comparative Example 5 | Comparative Example 6 |
|---|---|---|---|---|
| C.I. Direct Red 227 | 1.5 | 4 | 3.5 | |
| C.I. Acid Red 52 | | | | |
| C.I. Acid Red 249 | 0.7 | | | |
| C.I. Direct Yellow 86 | | 2.2 | 0.5 | |
| C.I. Direct Yellow 132 | | 1 | 2.5 | |
| C.I. Acid Yellow 32 | 0.8 | | | |
| C.I. Direct Blue 86 | | | 5 | |
| C.I. Direct Blue 199 | | | | 5 |
| C.I. Acid Blue 9 | | 2 | | |
| C.I. Direct Black 68 | | | | 4.5 |
| TEGmBE | | 12 12 12 | 7 7 7 | |
| DEGmBE | 10 10 10 | | | 10 |
| Diethylene glycol | 11 15 13 | 19 20 18 | | 12 |
| Glycerin | | | 7 9 6 | |
| Surfynol 465* | 0.7 0.7 0.7 | 0.7 0.7 0.7 | 1 1 1 | 0.5 |
| Proxel XL-2** | 0.3 0.3 0.3 | 0.3 0.3 0.3 | 0.3 0.3 0.3 | 0.3 |

*Acetylene glycol surface active agent (Shin-Etsu Chemical Co., Ltd.)
**mildewproofing agent (Zeneka)

The ink compositions obtained by mixing the components set forth in Tables 2 to 4 were each thoroughly stirred, and then filtered through a membrane filter having a pore diameter of 0.8 μm. The resulting ink compositions and sets were then evaluated for the following ten properties.

Evaluation Test

[A] Evaluation of Printing Properties (a) Printing machine used in test

MJ-700V2C (available from Seiko Epson Corporation) was used. The evaluation was conducted with the response frequency, resolution and ink discharge adjusted to 3.6 KHz, 360 dots/in. and 0.05 μg/dot, respectively.

(b) Recording paper used in test (1) Ordinary neutral paper (regenerated paper) (Xerox-R; Fuji Xerox Co., Ltd.)

(2) Bond paper [Neenah bond (25% cotton fiber); Neenah Bond Inc.]

(3) Ordinary acid paper (Canon Dry; Canon Hanbai K.K.)

(4) Ordinary acid paper (EPP; Epson Hanbai K.K.)

(5) Ordinary neutral paper (Xerox 4024 3R721; Xerox)

(c) Testing method

Test 1: Quality of Monochromatic Print

The various ink compositions were typed to print an alphabet. The printed alphabet was then visually observed for the occurrence of "bleeding" and "whisker". The results were evaluated by the following four-step criterion:

AA: Little or no "bleeding" or "whisker" were observed;

BB: "Bleeding" or "whisker" was slightly observed on some kinds of papers;

CC: "Bleeding" or "whisker" was observed on some kinds of papers; and

DD: "Bleeding" or "whisker" was observed on all kinds of papers

Test 2: Quality of Overtyped Print

One of the various ink compositions was solid-typed (100% duty solid). The other two ink compositions were then each solid-typed adjacent to the foregoing solid-typed area so that three solid-typed areas were formed adjacent to each other. The border of these solid-typed areas were then visually observed for bleeding. The results were evaluated by the following four-step criterion:

AA: Little or no "bleeding" or "whisker" due to color stain were observed in any combination;

BB: "Bleeding" or "whisker" due to color stain was slightly observed on some kinds of papers;

CC: "Bleeding" or "whisker" due to color stain was observed on some kinds of papers in some combinations; and DD: "Bleeding" or "whisker" due to color stain was observed on all kinds of papers Test 3: Color Reproducibility Using the various ink compositions in combination, yellow, magenta, cyan, red, green, blue and black were solid-typed. In some detail, red was formed by overtyping the yellow ink and the magenta ink on each other. Green was formed by overtyping the yellow ink and the cyan ink on each other. Blue was formed by overtyping the magenta ink and the cyan ink on each other. Black was formed by overtyping the yellow ink, the magenta ink and the cyan ink on each other.

The solid-typed print image (3×3 cm) was then measured for L*a*b* color specification system by color difference method specified in CIE (Commision Internationale de l'Eclairage) by means of Macbeth CE-7000 spectrophotometer (available from Macbeth Inc.). The color difference between the measured value and the standard color tone value specified in ISO 2845-1975 shown in Table 5 was determined by the following equation (II) to evaluate the color reproducibility.

TABLE 5

| | L* | a* | b* |
|---|---|---|---|
| Magenta | 48.4 | 78.1 | -7.1 |
| Yellow | 90.7 | -18.4 | 91.1 |
| Cyan | 53.9 | -19.1 | -54.2 |
| Red | 47.4 | 70.3 | 47.5 |
| Green | 47.6 | -74.1 | 23.2 |

TABLE 5-continued

|       | L*   | a*   | b*    |
|-------|------|------|-------|
| Blue  | 19.2 | 35.5 | −53.0 |
| Black | 28.6 | 0.1  | −2.5  |

Equation (II):

$$\Delta E^*ab = [(\Delta L^*)^2 + (\Delta a^*)^2 + (\Delta b^*)^2]^{1/2} \quad (II)$$

The resulting color difference ΔE*ab was averaged over 5 sheets of recording papers. The results were then evaluated by the following criterion:
- AA: Not more than 20;
- BB: From more than 20 to not more than 30; and
- CC: More than 30

Test 4: Quick-drying Properties

The various ink composition sets were each monochromatically solid-typed. Further, two of the various ink compositions were overtyped solid. When a predetermined period of time passed after printing, the printed recording paper and the same kind of paper were kept in contact with each other under a load of 200 g/cm². The specimen was then observed for the occurrence of ink migration from one paper to another. The results were evaluated by the following four-step criterion:
- AA: No ink migration was observed even for a period of time less than 1 second after printing in all printed areas;
- BB: No ink migration was observed even for a period of time from not less than 1 second to less than 2 seconds after printing in all printed areas;
- CC: No ink migration was observed even for a period of time from not less than 2 seconds to less than 5 seconds after printing in all printed areas; and
- DD: Ink migration was still observed after the passage of not less than 5 seconds from printing in all printed areas Test 5: Jetting Stability (1) (Recovery from nozzle clogging)

The various ink compositions were each loaded in the printer. The printer was then operated to confirm that the ink droplet was jetted through all the nozzles. Thereafter, the printer was allowed to stand at a temperature of 40° C. and a relative humidity of 25% with the recording head left uncapped. After 7 days and after one month, printing was conducted. The time of repetition of recovery operations required until all the nozzles could jet the ink (cleaning by pumping up about 1 ml) was determined. The results were evaluated by the following three-step criterion:

Judgement after 7 days:
- AA: Normal printing was made possible after one recovery operation;
- BB: Normal printing was made possible after 2 to 4 recovery operations; and
- CC: Normal printing was made possible after not less than 5 recovery operations Judgement after one month:
- AA: Normal printing was made possible immediately or after 3 or less recovery operations;
- BB: Normal printing was made possible after 4 to 10 recovery operations; and
- CC: Normal printing was made possible after not less than 11 recovery operations or left impossible even after not less than 11 recovery operations Test 6: Jetting Stability (2) (Prolonged continuous recording)

The various ink compositions were each continuously typed at temperatures of 5° C., 20° C. and 40° C. for 48 hours. The time required until dot blank and ink scattering were observed 10 times in all was measured. The results were evaluated by the following three-step criterion:
- AA: No dot blanks were observed at all temperatures, providing stable printing;
- BB: Dot blanks occurred with time in any temperature; and
- CC: Dot blanks began to occur at the initial stage of printing in any temperature Test 7: High Speed Response The various ink compositions were each continuously typed at ordinary temperatures with the driving frequency of the recording head adjusted to 10 KHz. The time required until dot blank and ink scattering were observed 10 times in all was measured. The results were evaluated by the following four-step criterion:
- AA: Not less than 48 hours with all the ink compositions;
- BB: From 24 to 48 hours with any ink composition;
- CC: From 1 to 24 hours with any ink composition; and
- DD: Not more than 1 hour with any ink composition Test 8: Intermittent Jetting Stability The various ink compositions were each typed over one line at a temperature of 15° C. and a relative humidity of 20%. The typing was then suspended over a predetermined period of time. Thereafter, the typing was resumed. The accumulated suspension time required until dot blank or deflected ink fly was observed at the first dot after the resumption of typing was determined. The results were evaluated by the following seven-step criterion. The following steps 1 to 4 can be considered practically good.
- 1: Not less than 60 seconds;
- 2: From 40 to 60 seconds;
- 3: From 30 to 40 seconds;
- 4: From 20 to 30 seconds;
- AA: From 10 to 20 seconds;
- BB: From 5 to 10 seconds; and
- CC: Less than 5 seconds

[B] Evaluation of humidity resistance of recorded matters (a) Printing machine used in test and printing conditions The same printing machine as used in [A] (a) was used under the same printing conditions as in [A] (a).

(b) Recording paper used in test
  (1) Paper adapted for ink jet: Superfine Paper (Epson Hanbai K.K.)
  (2) Film adapted for ink jet: Gloss film (Epson Hanbai K.K.)

Both the two recording papers have an ink-receptive layer comprising a polyvinyl alcohol incorporated therein as a water-soluble high molecular compound.

(c) Testing method

Test 9: Humidity Resistance

The various ink compositions were each solid-typed (100% duty solid), 200% solid-typed (ink jetting rate doubled) or 300% solid-typed (ink jetting rate tripled) to form a print pattern having white letters marked therein. The printed matter was then allowed to stand at a temperature of 40° C. and a relative humidity of 90% for 2 hours. The printed matter was then visually evaluated for bleeding on the printed area by the following criterion:
- AA: No bleeding observed;
- BB: Slight bleeding observed; and CC: Bleeding observed

|C| Evaluation of Light Resistance of Recorded Matter

The same printing machine as used in |A| (a) was used under the same printing conditions as in |A| (a).

(b) Recording paper used in test
  (1) Paper adapted for ink jet: Superfine Paper (Epson Hanbai K.K.)
  (2) Ordinary paper: Xerox-P (Fuji Xerox Co., Ltd.)

(c) Testing method

Test 10: Light Resistance

Printing was conducted in the same manner as in Test 3. The recorded matter was then irradiated with light by means of a xenon fade tester (available from Shimazu Corp.) for 60 hours. The color difference $\Delta E^*ab$ between before and after testing was calculated by the equation (II). The light resistance was evaluated by the following criterion:

AA: Not more than 20;

BB: From more than 20 to not more than 40; and

CC: More than 40

The results of Tests 1 to 10 are set forth in Tables 6 and 7. In these tables, M represents magenta, Y represents yellow, C represents cyan, R represents red, G represents green, B represents blue, and K represents black.

TABLE 6

| | | Examples | | | | | | Comparative Examples | | | | | |
|---|---|---|---|---|---|---|---|---|---|---|---|---|---|
| | | 1 | 2 | 3 | 4 | 5 | 6 | 1 | 2 | 3 | 4 | 5 | 6 |
| Test 1 | M | AA | AA | AA | AA | AA | AA | AA | AA | AA | AA | AA | AA |
| | Y | AA | AA | AA | AA | AA | AA | AA | AA | AA | AA | AA | |
| | C | AA | AA | AA | AA | AA | AA | AA | AA | AA | AA | AA | |
| Test 2 | | AA | AA | AA | AA | AA | AA | AA | AA | AA | AA | AA | |
| Test 3 | M | AA | AA | AA | AA | AA | AA | CC | CC | BB | CC | CC | |
| | Y | AA | AA | AA | AA | AA | BB | BB | CC | CC | CC | CC | |
| | C | AA | AA | AA | AA | AA | BB | BB | BB | BB | BB | BB | |
| | R | AA | AA | AA | AA | AA | BB | CC | CC | BB | CC | CC | |
| | G | BB | AA | AA | AA | AA | BB | BB | CC | CC | CC | CC | |
| | B | BB | AA | AA | AA | AA | AA | BB | CC | BB | CC | BB | |
| | K | BB | AA | AA | AA | BB | BB | CC | CC | CC | CC | CC | |
| Test 4 | | AA | AA | AA | AA | AA | AA | AA | AA | AA | AA | AA | AA |
| Test 5 | | | | | | | | | | | | | |
| | 7 days | | | | | | | | | | | | |
| | M | BB | AA | AA | AA | AA | AA | BB | BB | BB | CC | CC | |
| | Y | BB | AA | AA | AA | AA | AA | BB | BB | BB | CC | CC | |
| | C | BB | AA | AA | AA | AA | AA | BB | BB | BB | CC | CC | |
| | M | AA | AA | AA | AA | AA | AA | AA | AA | BB | CC | BB | |
| | 1 month | | | | | | | | | | | | |
| | Y | AA | AA | AA | AA | AA | AA | AA | AA | AA | BB | BB | |
| | C | AA | AA | AA | AA | AA | AA | AA | AA | AA | CC | CC | |
| Test 6 | M | AA | AA | AA | AA | AA | AA | AA | AA | AA | AA | AA | |
| | Y | AA | AA | AA | AA | AA | AA | AA | AA | AA | AA | AA | |
| | C | AA | AA | AA | AA | AA | AA | AA | AA | AA | AA | AA | |
| Test 7 | | AA | AA | AA | AA | AA | AA | AA | AA | AA | AA | AA | AA |
| Test 8 | M | 3 | 1 | 1 | 3 | 2 | 3 | 3 | 1 | 3 | BB | BB | CC |
| | Y | 3 | 1 | 1 | 3 | 2 | 3 | 3 | 1 | 3 | 2 | 3 | |
| | C | 1 | 1 | 1 | 3 | 1 | 3 | 1 | 1 | 3 | BB | BB | |

TABLE 7

| | | Examples | | | | | | Comparative Examples | | | | |
|---|---|---|---|---|---|---|---|---|---|---|---|---|
| | | 1 | 2 | 3 | 4 | 5 | 6 | 1 | 2 | 3 | 4 | 5 |
| Test 9 | Duty 100% | | | | | | | | | | | |
| | (1) | | | | | | | | | | | |
| | M | AA | AA | AA | AA | AA | AA | CC | BB | BB | BB | BB |
| | Y | AA | AA | AA | AA | AA | AA | BB | BB | BB | BB | BB |
| | C | AA | AA | AA | AA | AA | AA | CC | CC | BB | BB | BB |
| | (2) | | | | | | | | | | | |
| | M | AA | AA | AA | AA | AA | AA | CC | CC | BB | BB | BB |
| | Y | AA | AA | AA | AA | AA | AA | CC | BB | BB | BB | BB |
| | C | AA | AA | AA | AA | AA | AA | CC | CC | CC | BB | BB |
| | Duty 200% | | | | | | | | | | | |
| | (1) | | | | | | | | | | | |
| | M | AA | AA | AA | AA | AA | AA | CC | CC | BB | BB | BB |
| | Y | AA | AA | AA | AA | AA | AA | BB | BB | BB | BB | BB |
| | C | AA | AA | AA | AA | AA | AA | CC | CC | CC | BB | BB |

TABLE 7-continued

|  |  | Examples | | | | | | Comparative Examples | | | | |
|---|---|---|---|---|---|---|---|---|---|---|---|---|
|  |  | 1 | 2 | 3 | 4 | 5 | 6 | 1 | 2 | 3 | 4 | 5 |
|  | (2) | | | | | | | | | | | |
|  | M | AA | AA | AA | AA | AA | AA | CC | CC | CC | BB | BB |
|  | Y | AA | AA | AA | AA | AA | AA | CC | BB | BB | BB | BB |
|  | C | AA | AA | AA | AA | AA | AA | CC | CC | CC | BB | BB |
|  | Duty 300% | | | | | | | | | | | |
|  | (1) | | | | | | | | | | | |
|  | M | AA | AA | AA | AA | AA | AA | CC | CC | CC | BB | BB |
|  | Y | AA | AA | AA | AA | AA | AA | CC | CC | CC | BB | BB |
|  | C | AA | AA | AA | AA | AA | AA | CC | CC | CC | BB | BB |
|  | (2) | | | | | | | | | | | |
|  | M | AA | AA | AA | AA | AA | AA | CC | CC | CC | BB | BB |
|  | Y | AA | AA | AA | AA | AA | AA | CC | CC | CC | BB | BB |
|  | C | AA | AA | AA | AA | AA | AA | CC | CC | CC | BB | BB |
| Test 10 | Duty 300% | | | | | | | | | | | |
|  | (1) | | | | | | | | | | | |
|  | M | AA | AA | AA | AA | AA | AA | CC | CC | CC | BB | BB |
|  | Y | AA | AA | AA | AA | AA | AA | BB | BB | CC | BB | BB |
|  | C | AA | AA | AA | AA | AA | AA | CC | CC | CC | BB | BB |
|  | (2) | | | | | | | | | | | |
|  | M | AA | AA | AA | AA | AA | AA | CC | CC | CC | BB | BB |
|  | Y | AA | AA | AA | AA | AA | AA | CC | CC | CC | BB | BB |
|  | C | AA | AA | AA | AA | AA | AA | CC | CC | CC | BB | BB |

EFFECT OF THE INVENTION

In the present invention, a printed matter with an excellent light resistance and an extremely good preservability can be obtained free from bleeding due to humidity regardless of duty in the printing on paper and film adapted for ink jet recording.

Further, in the present invention, an excellent color reproducibility can be obtained with an almost ideal tone with respect to red, green, blue and black formed by overtyping the various ink compositions, not to mention magenta, yellow and cyan. In particular, with respect to black formed by overtyping the three color ink compositions, an ideal color tone superior to an ink comprising a black dye can be realized.

While the invention has been described in detail and with reference to specific embodiments thereof, it will be apparent to one skilled in the art that various changes and modifications can be made therein without departing from the spirit and scope thereof.

What is claimed is:

1. A set of ink compositions for color ink jet recording each containing at least a dye, a water-soluble high boiling low volatility organic solvent and water, comprisinng in combination a magenta ink composition having C.I. Direct Red 227 incorporated therein as a dye in an amount of from 0.3 to 3.5% by weight, a yellow ink composition having a 1:3 to 3:1 mixture by weight of C.I. Direct Yellow 86 and C.I. Direct Yellow 132 incorporated therein as a dye in an amount of from 0.3 to 3.0% by weight, and a cyan ink composition having a dye selected from the group consisting of C.I. Direct Blue 86 and C.I. Direct Blue 199 incorporated therein as a dye in an amount of from 1.0 to 4.0% by weight.

2. The set according to claim 1, wherein said ink compositions each further comprise a lower alkyl ether of a polyvalent alcohol in an amount of from 7 to 12% by weight and an acetylene glycol represented by the following general formula (I) in an amount of from 0.5 to 1.2% by weight:

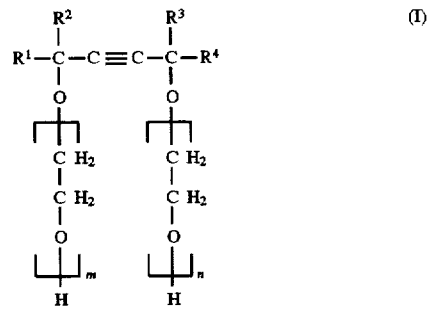

wherein $R^1$, $R^2$, $R^3$ and $R^4$ each independently represent a $C_{1-6}$ alkyl group; the sum of n and m is from 0 to 30.

3. The set according to claim 2, wherein the sum of the content of said water-soluble high boiling low volatility organic solvent and said lower alkyl ether of polyvalent alcohol contained in each of said ink compositions is from 15 to 30% by weight.

4. An ink cartridge, loaded with a magenta ink composition, a yellow ink composition and a cyan ink composition according to claim 1 each loaded in a compartment.

5. The ink cartridge according to claim 4, wherein said magenta ink composition, yellow ink composition and cyan ink composition each comprise a lower alkyl ether of polyvalent alcohol in an amount of from 7 to 12% by weight and an acetylene glycol represented by the following general formula (I) in an amount of from 0.5 to 1.2% by weight:

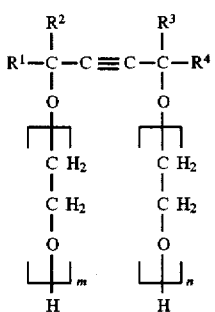 (I)

wherein $R^1$, $R^2$, $R^3$ and $R^4$ each independently represent a $C_{1-6}$ alkyl group; and the sum of n and m is from 0 to 30.

6. The ink cartridge according to claim 5, wherein the sum of the content of said water-soluble high boiling low volatility organic solvent and said lower alkyl ether of polyvalent alcohol contained in each of said ink compositions is from 15 to 30% by weight.

7. A color ink jet recording apparatus, comprising an ink cartridge according to claim 4.

8. A color ink jet recording method which comprises forming a color image with at least a magenta ink composition, a yellow ink composition and a cyan ink composition, wherein said magenta, yellow and cyan ink compositions comprise an ink composition set according to claim 1.

9. A color image formed by a color by a color ink jet recording method which comprises forming a color image with at least a magenta ink composition, a yellow ink composition and a cyan ink composition, wherein said magenta, yellow and cyan ink composition comprise an ink composition according to claim 1.

* * * * *